(12) United States Patent
Binkai et al.

(10) Patent No.: US 11,271,658 B2
(45) Date of Patent: Mar. 8, 2022

(54) OPTICAL RECEIVER, LIGHT SIGNAL RECEIVING METHOD, AND DATA REPRODUCTION DEVICE

(71) Applicant: Mitsubishi Electric Corporation, Tokyo (JP)

(72) Inventors: Masashi Binkai, Tokyo (JP); Tsuyoshi Yoshida, Tokyo (JP); Keisuke Matsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/147,234

(22) Filed: Jan. 12, 2021

(65) Prior Publication Data
US 2021/0135765 A1 May 6, 2021

Related U.S. Application Data (63) Continuation of application No. PCT/JP2018/030985, filed on Aug. 22, 2018.

(51) Int. Cl.
*H04B 10/61* (2013.01)
*H04J 14/06* (2006.01)

(52) U.S. Cl.
CPC ....... *H04B 10/614* (2013.01); *H04B 10/6151* (2013.01); *H04B 10/6162* (2013.01); *H04B 10/6165* (2013.01); *H04J 14/06* (2013.01)

(58) Field of Classification Search
CPC ... H04J 14/06; H04B 10/614; H04B 10/6151; H04B 10/6162; H04B 10/6165; H04B 10/6166; H04B 3/04
(Continued)

(56) References Cited

U.S. PATENT DOCUMENTS

2004/0240595 A1* 12/2004 Raphaeli ........... H04L 25/03012
375/350
2010/0329698 A1 12/2010 Nakashima
(Continued)

FOREIGN PATENT DOCUMENTS

JP 2011-15013 A 1/2011
JP 2013-168983 A 8/2013
(Continued)

OTHER PUBLICATIONS

Abdo et al; Adaptive filtering in optical coherent flexible bit-rate receivers in the presence of State of polarization transients and color noise; Nov. 2019; Hindawi Journal of Computer Networks and Communications; pp. 1-12. (Year: 2019).*
(Continued)

*Primary Examiner* — Amritbir K Sandhu
(74) *Attorney, Agent, or Firm* — Birch, Stewart, Kolasch & Birch, LLP (57) ABSTRACT

A coherent receiver performing coherent detection on polarization multiplex light into which first polarization light and second polarization light are multiplexed, and splitting the polarization multiplex light into the first polarization light and the second polarization light, an adaptive equalizer compensating the waveform distortion of a signal superimposed onto the first polarization light by using a first FIR filter, compensating the waveform distortion of a signal superimposed onto the second polarization light by using a second FIR filter, and by decoding each of the signals whose waveform distortion has been compensated, generating their respective decoded data, an error ratio calculator calculating the bit error ratio of each decoded data generated by the adaptive equalizer, a margin calculator calculating a margin from the bit error ratio of an error correction limit in each bit error ratio calculated by the error ratio calculator, and a tap number controller setting up the numbers of taps of the first
(Continued)

and second FIR filters by referring to the respective margins calculated by the margin calculator are included.

6 Claims, 7 Drawing Sheets

(58) Field of Classification Search
USPC .................................................. 398/202–214
See application file for complete search history.

(56) References Cited

U.S. PATENT DOCUMENTS

| | | | |
|---|---|---|---|
| 2014/0029938 A1 | 1/2014 | Nakashima et al. | |
| 2015/0180586 A1* | 6/2015 | Oota | H04L 25/03114 398/27 |
| 2015/0229401 A1 | 8/2015 | Tanaka et al. | |
| 2016/0020857 A1* | 1/2016 | Jia | H04B 10/61 398/208 |
| 2017/0078017 A1* | 3/2017 | Dahan | H04B 10/6162 |
| 2018/0034552 A1* | 2/2018 | Oyama | G02B 6/12009 |
| 2020/0119814 A1* | 4/2020 | Binkai | H04B 10/6162 |

FOREIGN PATENT DOCUMENTS

| | | |
|---|---|---|
| JP | 2013-223128 A | 10/2013 |
| JP | 2014-27467 A | 2/2014 |
| JP | 2015-122632 A | 7/2015 |
| JP | 2015-154204 A | 8/2015 |
| JP | 2016-119641 A | 6/2016 |

OTHER PUBLICATIONS

Santos et al; Filter bank Multi Sub band transmission for Optical systems with Mode multiplexing; 2018; IEEE; pp. 1-13. (Year: 2018).*
Abdo et al; Adaptive Filtering in Optical Coherent Flexible Bit-Rate Receivers in the Presence of State-of-Polarization Transients and Colored Noise; Nov. 21019; Hindawi Journal of Computer Networks and Communications; pp. 1-12. (Year: 2019).*
Japanese Notice of Reasons for Refusal, issued in JP Application No. 2020-537937 dated Nov. 10, 2020.
Yamashita et al., "Measurement of High Speed Polarization Change of Optical Signal through an OPGW Caused by Serge Current", IEEJ Transactions on Electronics, Information and Systems, 2016, vol. 136, No. 7, pp. 887-892.

* cited by examiner

OPTICAL RECEIVER, LIGHT SIGNAL RECEIVING METHOD, AND DATA REPRODUCTION DEVICE

CROSS REFERENCE TO RELATED APPLICATION

This application is a Continuation of PCT International Application No. PCT/JP2018/030985, filed on Aug. 22, 2018, which is hereby expressly incorporated by reference into the present application.

TECHNICAL FIELD

The present disclosure relates to an optical receiver, a light signal receiving method, and a data reproduction device that set up the number of taps of a finite impulse response filter.

BACKGROUND ART

In recent years, in optical communication systems, a digital coherent technique in which digital signal processing and coherent detection are combined is used in order to implement long distance transmission of light signals and transmission of large-volume light signals.

In digital coherent techniques, polarization multiplex light is transmitted using, for example, dual-polarization quadrature phase shift keying (DP-QPSK).

Polarization multiplex light may have a polarization variation under the influence of turbulence or the like when transmitted through a transmission line.

It is known that a polarization variation in polarization multiplex light affects the performance of improving the bit error ratio (BER) of reception in an optical receiver.

In Patent Literature 1 below, a digital coherent receiver that can demodulate a received signal even when a variation occurs in the state of polarization (SOP) in a transmission line is disclosed. The digital coherent receiver disclosed in Patent Literature 1 performs adaptive control on a step size parameter by which the tap coefficient of the finite impulse response (FIR) filter of an adaptive equalizer is multiplied when updating the tap coefficient, in accordance with the speed of the variation of SOP.

CITATION LIST

Patent Literature

Patent Literature 1: JP 2013-223128 A

SUMMARY OF INVENTION

Technical Problem

The digital coherent receiver disclosed in Patent Literature 1 can suppress the degradation in the transmission quality caused by the influence of the polarization variation when the polarization variation is a gradual one varying in several seconds.

However, a problem is that when the polarization variation is a rapid one varying in a time of several tens of microseconds, it is difficult to suppress the degradation in the transmission quality caused by the influence of the polarization variation only by performing the adaptive control on the step size parameter.

The present disclosure is made in order to solve the above-mentioned problem, and it is therefore an object of the present disclosure to provide an optical receiver, a light signal receiving method, and a data reproduction device capable of, even when a polarization variation is a rapid one varying in a time of several tens of microseconds, suppressing the degradation in the transmission quality caused by the influence of the polarization variation.

Solution to Problem

An optical receiver according to the present disclosure includes: an optical receiver comprising: a coherent receiver performing coherent detection on polarization multiplex light into which first polarization light and second polarization light are multiplexed, and splitting the polarization multiplex light into the first polarization light and the second polarization light; an adaptive equalizer compensating the waveform distortion of a signal superimposed onto the first polarization light by using a first finite impulse response filter, compensating the waveform distortion of a signal superimposed onto the second polarization light by using a second finite impulse response filter, and by decoding each of the signals whose waveform distortion has been compensated, generating their respective decoded data; an error ratio calculator calculating the bit error ratio of each decoded data generated by the adaptive equalizer; a margin calculator calculating a margin from the bit error ratio of an error correction limit in each bit error ratio calculated by the error ratio calculator; and a tap number controller for setting up the numbers of taps of the first and second finite impulse response filters by referring to the respective margins calculated by the margin calculator.

Advantageous Effects of Invention

According to the present disclosure, the optical receiver is configured in such a way as to include the tap number controller for setting up the numbers of taps of the first and second finite impulse response filters on the basis of the respective margins calculated by the margin calculator. Therefore, the optical receiver according to the present disclosure can suppress the degradation in the transmission quality which is caused by the influence of the polarization variation even in the case in which the polarization variation is a rapid one varying in a time of several tens of microseconds.

BRIEF DESCRIPTION OF DRAWINGS

FIG. 4 is a hardware block diagram of a computer in the case in which the digital signal processor 14 is implemented by software, firmware, or the like;

FIG. 5 is a flowchart showing a part of a light signal receiving method which is a processing procedure in the case in which the digital signal processor 14 is implemented by software, firmware, or the like;

DESCRIPTION OF EMBODIMENTS

Hereinafter, in order to explain the present disclosure in greater detail, embodiments of the present disclosure will be described with reference to the accompanying drawings.

Embodiment 1

Figure 1:
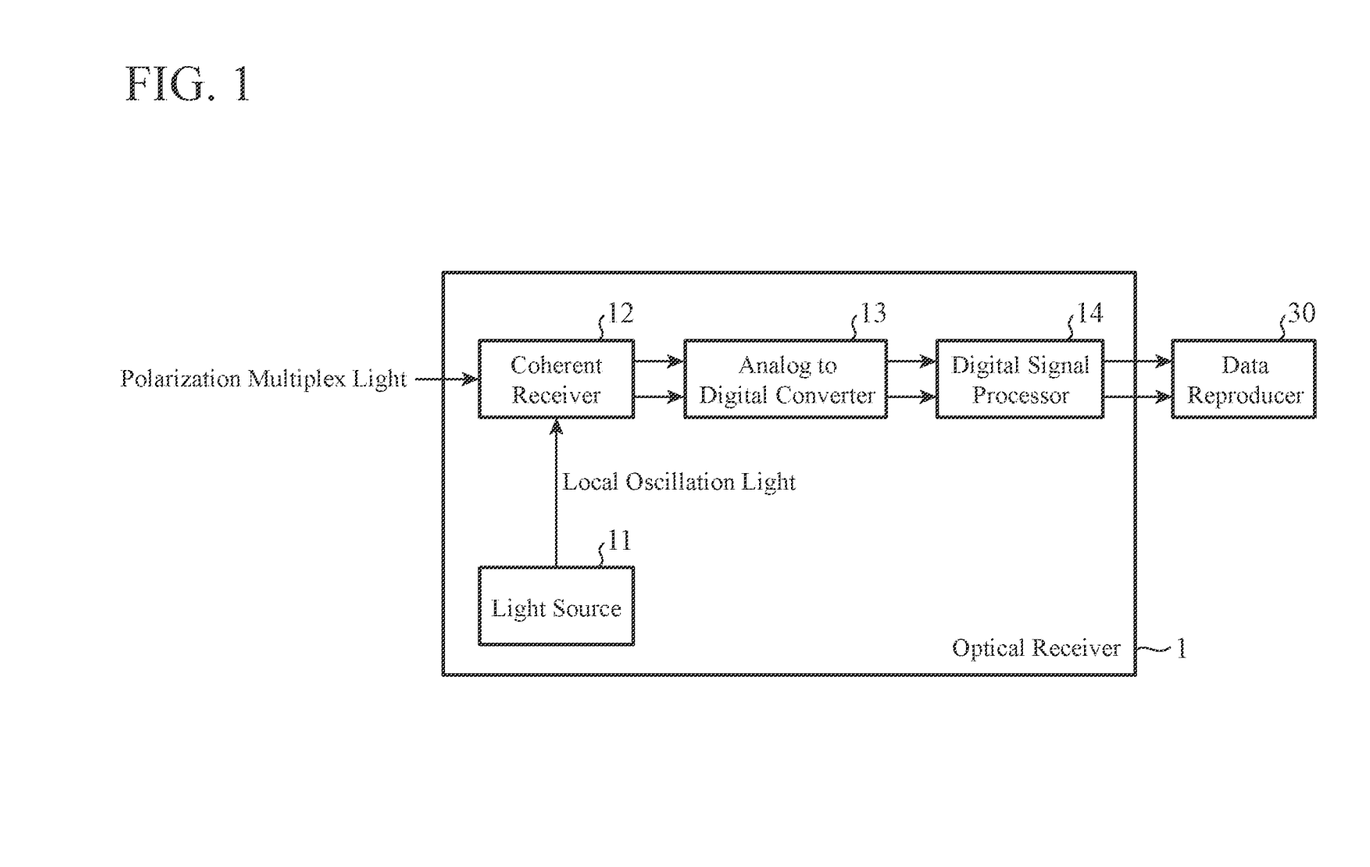
FIG. 1 is a schematic diagram showing a data reproduction device including an optical receiver according to Embodiment 1.

FIG. 1 is a schematic diagram showing a data reproduction device including an optical receiver 1 according to Embodiment 1.

Figure 2:
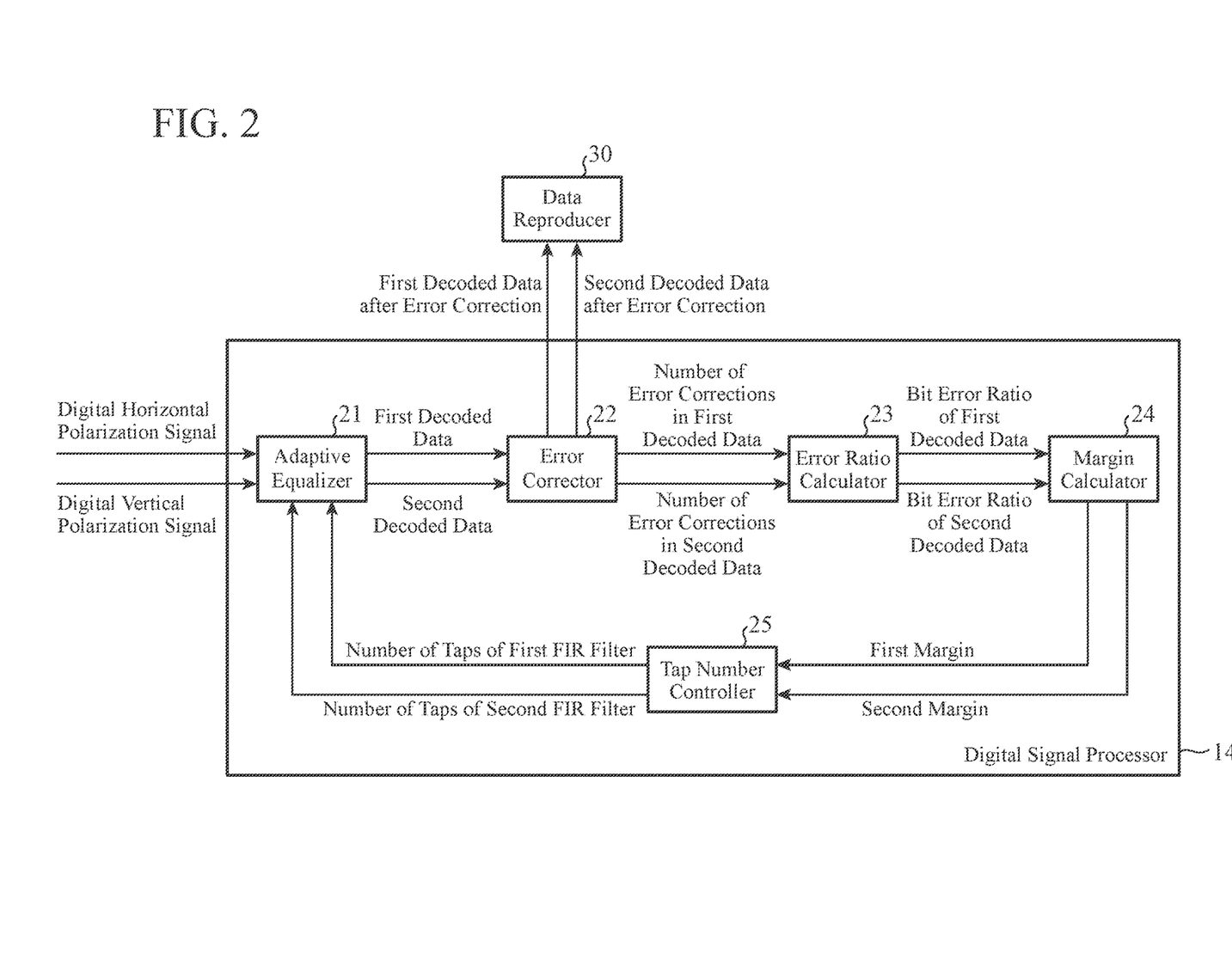
FIG. 2 is a schematic diagram showing a digital signal processor 14 of the optical receiver 1.

FIG. 2 is a schematic diagram showing a digital signal processor 14 of the optical receiver 1.

Figure 3:
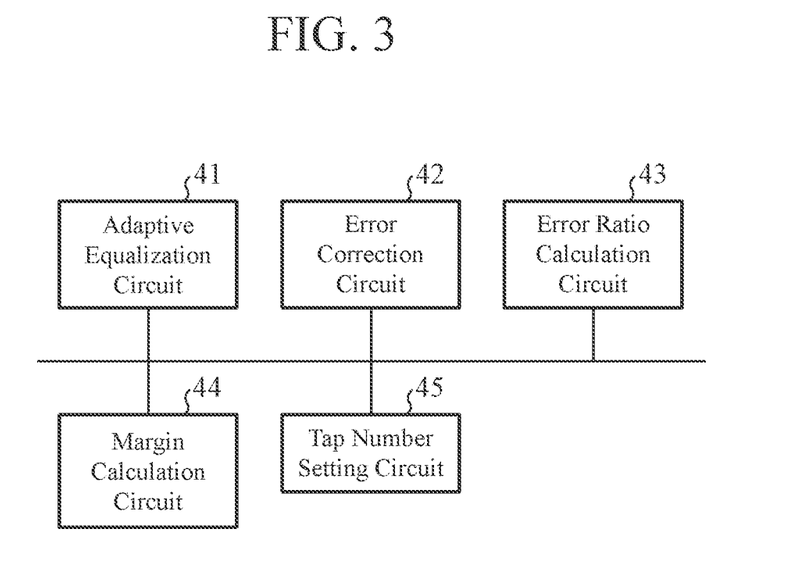
FIG. 3 is a hardware block diagram showing the hardware of the digital signal processor 14.

FIG. 3 is a hardware block diagram showing the hardware of the digital signal processor 14.

In FIGS. 1 to 3, the optical receiver 1 includes a light source 11, a coherent receiver 12, an analog to digital converter 13, and a digital signal processor 14.

The optical receiver 1 receives polarization multiplex light into which first polarization light and second polarization light are multiplexed, and decodes a signal superimposed onto each of the first and second polarization light rays, thereby generating their respective decoded data.

In Embodiment 1, for example, it is assumed that the first polarization light is horizontally polarized light, and the second polarization light is vertically polarized light.

It is assumed that a signal (referred to as a "first transmission signal" hereinafter) which is information to be transmitted is superimposed onto the horizontally polarized light, and a signal (referred to as a "second transmission signal" hereinafter) which is information to be transmitted is superimposed onto the vertically polarized light. As each information to be transmitted, image information or measurement information can be considered.

Further, it is assumed that the first and second transmission signals are modulated signals of DP-QPSK.

The light source 11 generates local oscillation light having the same wavelength as the polarization multiplex light, and outputs the local oscillation light to the coherent receiver 12.

The coherent receiver 12 is implemented by, for example, a polarization beam splitter, a 90-degree optical hybrid, and a photo diode.

The coherent receiver 12 receives the polarization multiplex light, and performs coherent detection on the polarization multiplex light by using the local oscillation light outputted from the light source 11.

The coherent receiver 12 splits the polarization multiplex light into the horizontally polarized light and the vertically polarized light, and converts each of the horizontally and vertically polarized light rays into an electric signal.

Hereinafter, the electric signal into which the horizontally polarized light is converted is referred to as the "horizontal polarization signal", and the electric signal into which the vertically polarized light is converted is referred to as the "vertical polarization signal."

The coherent receiver 12 outputs each of the horizontal and vertical polarization signals to the analog to digital converter 13.

The analog to digital converter 13 converts the horizontal polarization signal outputted from the coherent receiver 12 from an analog signal into a digital signal, and outputs the digital signal, as a digital horizontal polarization signal, to the digital signal processor 14.

The analog to digital converter 13 converts the vertical polarization signal outputted from the coherent receiver 12 from an analog signal into a digital signal, and outputs the digital signal, as a digital vertical polarization signal, to the digital signal processor 14.

The digital signal processor 14 includes an adaptive equalizer 21, an error corrector 22, an error ratio calculator 23, a margin calculator 24, and a tap number controller 25.

The digital signal processor 14 compensates for the waveform distortion of the first transmission signal superimposed onto the digital horizontal polarization signal, and decodes the first transmission signal after the waveform distortion compensation, thereby generating decoded data (referred to as "first decoded data" hereinafter).

The digital signal processor 14 compensates for the waveform distortion of the second transmission signal superimposed onto the digital vertical polarization signal, and decodes the second transmission signal after the waveform distortion compensation, thereby generating decoded data (referred to as "second decoded data" hereinafter).

The adaptive equalizer 21 is implemented by, for example, an adaptive equalization circuit 41 shown in FIG. 3.

The adaptive equalizer 21 includes a first finite impulse response filter and a second finite impulse response filter. Hereinafter, the finite impulse response filters are referred as the FIRs.

The adaptive equalizer 21 compensates for the waveform distortion of the first transmission signal superimposed onto the digital horizontal polarization signal by using the first FIR filter, and decodes the first transmission signal after the waveform distortion compensation, thereby generating first decoded data.

The adaptive equalizer 21 compensates for the waveform distortion of the second transmission signal superimposed onto the digital vertical polarization signal by using the second FIR filter, and decodes the second transmission signal after the waveform distortion compensation, thereby generating second decoded data.

The adaptive equalizer 21 outputs each of the first and second pieces of decoded data to the error corrector 22.

The error corrector 22 is implemented by, for example, an error correction circuit 42 shown in FIG. 3.

The error corrector 22 performs error correction to the first decoded data generated by the adaptive equalizer 21, and calculates the number of error corrections in the first decoded data.

The error corrector 22 performs error corrections to the second decoded data generated by the adaptive equalizer 21, and calculates the number of error corrections in the second decoded data.

The error corrector 22 outputs each of the first and second pieces of decoded data after the error correction to the data reproducer 30, and outputs each of the numbers of error corrections in the first and second pieces of decoded data to the error ratio calculator 23.

The error ratio calculator 23 is implemented by, for example, an error ratio calculation circuit 43 shown in FIG. 3.

The error ratio calculator 23 calculates a bit error ratio of the first decoded data after the error correction outputted from the error corrector 22, and calculates a bit error ratio of the second decoded data after the error correction outputted from the error corrector 22.

For example, the error ratio calculator 23 calculates the bit error ratio of the first decoded data from the number of error corrections in the first decoded data, the number of error corrections being calculated by the error corrector 22, and calculates the bit error ratio of the second decoded data from the number of error corrections in the second decoded data, the number of error corrections being calculated by the error corrector 22.

The error ratio calculator 23 outputs each of the bit error ratios of the first and second pieces of decoded data to the margin calculator 24.

The error ratio calculator 23 should just be able to calculate the bit error ratios of the first and second pieces of decoded data, and the calculation is not limited to the one of the bit error ratios of the first and second pieces of decoded data from the numbers of error corrections to the first and second pieces of decoded data. Therefore, the error ratio calculator 23 may receive the first and second pieces of decoded data which are outputted from the adaptive equalizer 21 and calculate the bit error ratios of the first and second pieces of decoded data. In this case, the error corrector 22 is unnecessary for the calculation of the bit error ratios.

The margin calculator 24 is implemented by, for example, a margin calculation circuit 44 shown in FIG. 3.

The margin calculator 24 calculates a margin (referred to as a "first margin" hereinafter) from the bit error ratio of the error correction limit in the bit error ratio of the first decoded data calculated by the error ratio calculator 23.

The margin calculator 24 calculates a margin (referred to as a "second margin" hereinafter) from the bit error ratio of the error correction limit in the bit error ratio of the second decoded data calculated by the error ratio calculator 23.

The bit error ratio of the error correction limit is a value which is determined in the error corrector 22 depending on the configuration for performing error correction, and the bit error ratio of the error correction limit is known in the margin calculator 24.

The margin calculator 24 outputs each of the first and second margins to the tap number controller 25.

The tap number controller 25 is implemented by, for example, a tap number setting circuit 45 shown in FIG. 3.

The tap number controller 25 sets up the number of taps of the first FIR filter which the adaptive equalizer 21 uses, on the basis of the first margin calculated by the margin calculator 24.

The tap number controller 25 sets up the number of taps of the second FIR filter which the adaptive equalizer 21 uses, on the basis of the second margin calculated by the margin calculator 24.

The data reproducer 30 records each of the first and second pieces of decoded data after the error correction which are outputted from the error corrector 22.

The data reproducer 30 generates the first and second pieces of decoded data recorded. For example, when the first and second pieces of decoded data are pieces of image data, the data reproducer 30 draws an image by reproducing the first and second pieces of decoded data.

In FIG. 2, it is assumed that each of the following components: the adaptive equalizer 21, the error corrector 22, the error ratio calculator 23, the margin calculator 24, and the tap number controller 25, which are the components of the digital signal processor 14, is implemented by hardware for exclusive use as shown in FIG. 3. More specifically, it is assumed that the digital signal processor 14 is implemented by the adaptive equalization circuit 41, the error correction circuit 42, the error ratio calculation circuit 43, the margin calculation circuit 44, and the tap number setting circuit 45.

Here, each of the following components: the adaptive equalization circuit 41, the error correction circuit 42, the error ratio calculation circuit 43, the margin calculation circuit 44, and the tap number setting circuit 45 is, for example, a single circuit, a composite circuit, a programmable processor, a parallel programmable processor, an application specific integrated circuit (ASIC), a field-programmable gate array (FPGA), or a combination of these circuits.

The components of the digital signal processor 14 are not limited to ones each implemented by hardware for exclusive use, and the digital signal processor 14 may be implemented by software, firmware, or a combination of software and firmware.

The software or the firmware is stored as a program in a memory of a computer. The computer refers to hardware that executes a program, and is, for example, a central processing unit (CPU), a central processing device, a processing device, an arithmetic device, a microprocessor, a microcomputer, a processor, or a digital signal processor (DSP).

Figure 4:
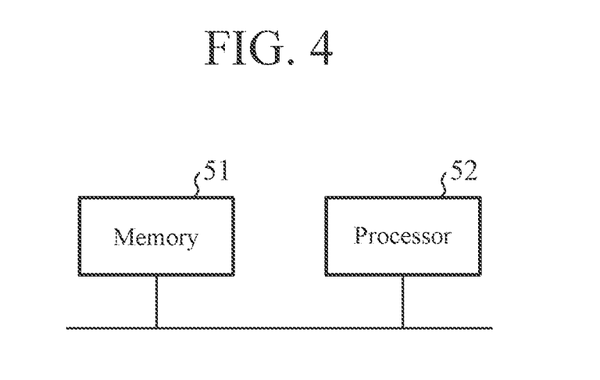

FIG. 4 is a hardware block diagram of the computer in the case in which the digital signal processor 14 is implemented by software, firmware, or the like.

In the case in which the digital signal processor 14 is implemented by software, firmware, or the like, a program for causing the computer to perform processing procedures of the adaptive equalizer 21, the error corrector 22, the error ratio calculator 23, the margin calculator 24, and the tap number controller 25 is stored in a memory 51. Then, a processor 52 of the computer executes the program stored in the memory 51.

Figure 5:
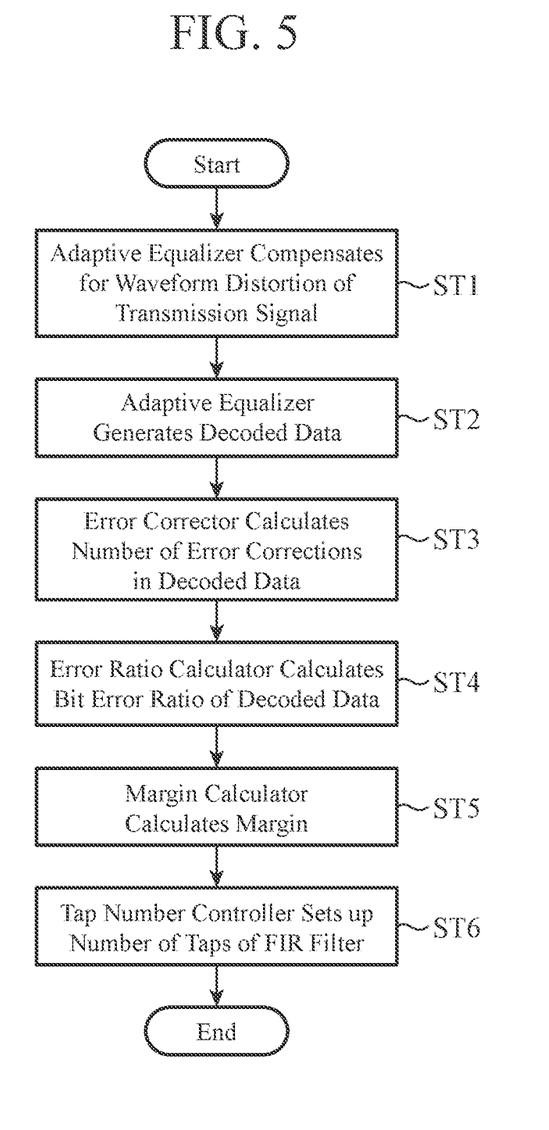

FIG. 5 is a flowchart showing a part of a light signal receiving method which is the processing procedures in the case in which the digital signal processor 14 is implemented by software, firmware, or the like.

Further, in FIG. 3, the example in which each of the components of the digital signal processor 14 is implemented by hardware for exclusive use is shown, and in FIG. 4, the example in which the digital signal processor 14 is implemented by software, firmware, or the like is shown. However, these are only examples, and some of the components of the digital signal processor 14 may be implemented by hardware for exclusive use and the remaining components may be implemented by software, firmware, or the like.

Next, the operation of the data reproduction device shown in FIG. 1 will be explained.

The light source 11 generates local oscillation light having the same wavelength as the polarization multiplex light into which the horizontal polarization signal and the vertical polarization signal are multiplexed, and outputs the local oscillation light to the coherent receiver 12.

The coherent receiver 12 receives the polarization multiplex light, and performs coherent detection on the polarization multiplex light by using the local oscillation light outputted from the light source 11, to split the polarization multiplex light into the horizontally polarized light and the vertically polarized light.

The coherent receiver 12 converts the horizontally polarized light into an electric signal, and outputs the electric signal, as a horizontal polarization signal, to the analog to digital converter 13.

The coherent receiver 12 converts the vertically polarized light into an electric signal, and outputs the electric signal, as a vertical polarization signal, to the analog to digital converter 13.

When receiving the horizontal polarization signal from the coherent receiver 12, the analog to digital converter 13 converts the horizontal polarization signal from an analog signal into a digital signal, and outputs this digital signal as a digital horizontal polarization signal to the digital signal processor 14.

When receiving the vertical polarization signal from the coherent receiver 12, the analog to digital converter 13 converts the vertical polarization signal from an analog signal into a digital signal, and outputs this digital signal as a digital vertical polarization signal to the digital signal processor 14.

When receiving the digital horizontal polarization signal from the analog to digital converter 13, the adaptive equalizer 21 of the digital signal processor 14 compensates for the waveform distortion of the first transmission signal superimposed onto the digital horizontal polarization signal by using the first FIR filter (step ST1 of FIG. 5).

When receiving the digital vertical polarization signal from the analog to digital converter 13, the adaptive equalizer 21 compensates for the waveform distortion of the second transmission signal superimposed onto the digital vertical polarization signal by using the second FIR filter (step ST1 of FIG. 5).

As the compensation for the waveform distortion in the adaptive equalizer 21, linear compensation for the waveform distortion, such as frequency offset compensation or wavelength dispersion compensation, is provided.

Further, the adaptive equalizer 21 generates first decoded data by decoding the first transmission signal after the waveform distortion compensation, and outputs the first decoded data to the error corrector 22 (step ST2 of FIG. 5).

The adaptive equalizer 21 generates second decoded data by decoding the second transmission signal after the waveform distortion compensation, and outputs the second decoded data to the error corrector 22 (step ST2 of FIG. 5).

As the process of decoding each of the first and second transmission signals in the adaptive equalizer 21, a symbol determination process shown below can be considered, for example.

The adaptive equalizer 21 performs the symbol determination process of comparing each of the transmission signals and a threshold, and assigning data of "1" as decoded data when the transmission signal is greater than the threshold, whereas assigning data of "0" as decoded data when the transmission signal is equal to or less than the threshold.

It is assumed that the threshold is stored in an internal memory of the adaptive equalizer 21. The threshold may be provided for the adaptive equalizer 21 from the outside.

When receiving the first decoded data from the adaptive equalizer 21, the error corrector 22 performs error correction to the first decoded data and calculates the number of error corrections in the first decoded data (step ST3 of FIG. 5).

When receiving the second decoded data from the adaptive equalizer 21, the error corrector 22 performs error correction to the second decoded data and calculates the number of error corrections in the second decoded data (step ST3 of FIG. 5).

As a method of performing error correction to decoded data, a method of correcting errors in the decoded data by using a low density parity check (LDPC) code can be used, for example.

The error corrector 22 outputs each of the first and second pieces of decoded data after the error correction to the data reproducer 30.

The error corrector 22 outputs each of the numbers of error corrections in the first and second pieces of decoded data to the error ratio calculator 23.

When receiving the number of error corrections in the first decoded data from the error corrector 22, the error ratio calculator 23 calculates the bit error ratio of the first decoded data by dividing the number of error corrections in the first decoded data by the total number of bits of the first decoded data (step ST4 of FIG. 5).

When receiving the number of error corrections in the second decoded data from the error corrector 22, the error ratio calculator 23 calculates the bit error ratio of the second decoded data by dividing the number of error corrections in the second decoded data by the total number of bits of the second decoded data (step ST4 of FIG. 5).

The error ratio calculator 23 outputs each of the bit error ratios of the first and second pieces of decoded data to the margin calculator 24.

When receiving the bit error ratio of the first decoded data from the error ratio calculator 23, the margin calculator 24 calculates a first margin from the bit error ratio of the error correction limit in the bit error ratio of the first decoded data, as shown in the following equation (1) (step ST5 of FIG. 5).

$$\text{First margin=bit error ratio of error correction limit−bit error ratio of first decoded data} \quad (1)$$

When receiving the bit error ratio of the second decoded data from the error ratio calculator 23, the margin calculator 24 calculates a second margin from the bit error ratio of the error correction limit in the bit error ratio of the second decoded data, as shown in the following equation (2) (step ST5 of FIG. 5).

$$\text{Second margin=bit error ratio of error correction limit−bit error ratio of second decoded data} \quad (2)$$

The bit error ratio of the error correction limit is the maximum error ratio at which bit errors can be corrected by the error corrector 22, and is a value which is determined depending on the configuration for performing error correction, and so on. The bit error ratio of the error correction limit is known in the margin calculator 24.

The margin calculator 24 outputs each of the first and second margins to the tap number controller 25.

When receiving the first margin from the margin calculator 24, the tap number controller 25 sets up the number of taps of the first FIR filter which the adaptive equalizer 21 uses, on the basis of the first margin (step ST6 of FIG. 5).

When receiving the second margin from the margin calculator 24, the tap number controller 25 sets up the number of taps of the second FIR filter which the adaptive equalizer 21 uses, on the basis of the second margin (step ST6 of FIG. 5).

Figure 6:
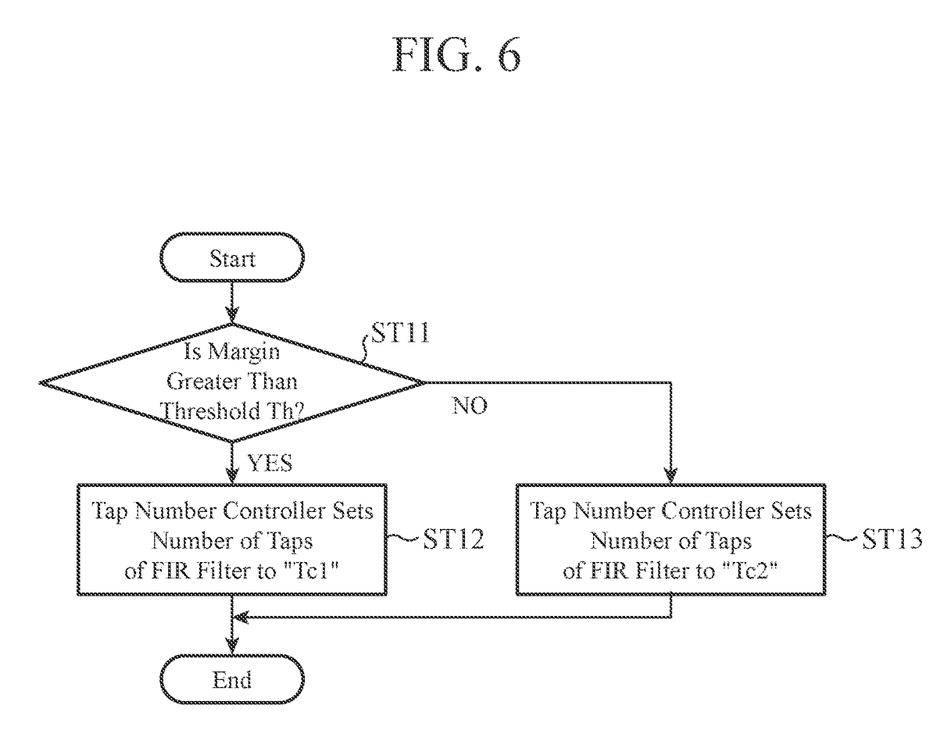
FIG. 6 is a flowchart showing a process of setting up the number of taps in a tap number controller 25.

FIG. 6 is a flowchart showing the process of setting up the numbers of taps in the tap number controller 25.

Hereinafter, the process of setting up the numbers of taps in the tap number controller 25 will be explained concretely with reference to FIG. 6.

It is assumed that a threshold Th for determining the size of each margin is stored in an internal memory of the tap number controller 25. The threshold Th may be provided for the tap number controller 25 from the outside.

Further, it is assumed that in the internal memory of the tap number controller 25, "Tc1" is stored as a first tap number and "Tc2" is stored as a second tap number. The following relationship: Tc1<Tc2 is established. The first and second tap numbers may be provided for the tap number controller 25 from the outside.

When receiving the first margin from the margin calculator 24, the tap number controller 25 compares the first margin and the threshold Th (step ST11 of FIG. 6).

When the first margin is greater than the threshold Th (when Yes in step ST11 of FIG. 6), the tap number controller 25 sets the number taps of the first FIR filter which the adaptive equalizer 21 uses to "Tc1" (step ST12 of FIG. 6).

Because the performance of resisting variations in the horizontally polarized wave is improved by setting the number of taps of the first FIR filter to "Tc1" less than "Tc2", the influence of a variation in the horizontally polarized wave can be reduced even when the variation in the horizontally polarized wave is a rapid one varying in a time of several tens of microseconds.

When the first margin is equal to or less than the threshold Th (when No in step ST11 of FIG. 6), the tap number controller 25 sets the number of taps of the first FIR filter which the adaptive equalizer 21 uses to "Tc2" (step ST13 of FIG. 6).

By setting the number of taps of the first FIR filter to "Tc2" greater than "Tc1", the performance of improving the bit error ratio can be improved. There is a trade-off relation between the performance of resisting variations in the horizontally polarized wave and the performance of improving the bit error ratio.

When receiving the second margin from the margin calculator 24, the tap number controller 25 compares the second margin and the threshold Th (step ST11 of FIG. 6).

When the second margin is greater than the threshold Th (when Yes in step ST11 of FIG. 6), the tap number controller 25 sets the number taps of the second FIR filter which the adaptive equalizer 21 uses to "Tc1" (step ST12 of FIG. 6).

Because the performance of resisting variations in the vertically polarized wave is improved by setting the number of taps of the second FIR filter to "Tc1" less than "Tc2", the influence of a variation in the vertically polarized wave can be reduced even when the variation in the vertically polarized wave is a rapid one varying in a time of several tens of microseconds.

When the second margin is equal to or less than the threshold Th (when No in step ST11 of FIG. 6), the tap number controller 25 sets the number of taps of the second FIR filter which the adaptive equalizer 21 uses to "Tc2" (step ST13 of FIG. 6).

By setting the number of taps of the second FIR filter to "Tc2" greater than "Tc1", the performance of improving the bit error ratio can be improved. There is a trade-off relation between the performance of resisting variations in the vertically polarized wave and the performance of improving the bit error ratio.

When receiving the first decoded data after the error correction and the second decoded data after the error correction from the error corrector 22, the data reproducer 30 records data of "00" when the first decoded data is data of "0" and the second decoded data is data of "0."

The data reproducer 30 records data of "10" when the first decoded data is data of "1" and the second decoded data is data of "0."

The data reproducer 30 records data of "01" when the first decoded data is data of "0" and the second decoded data is data of "1."

The data reproducer 30 records data of "11" when the first decoded data is data of "1" and the second decoded data is data of "1."

By reproducing the recorded data, the data reproducer 30 draws an image, for example.

Figure 7:
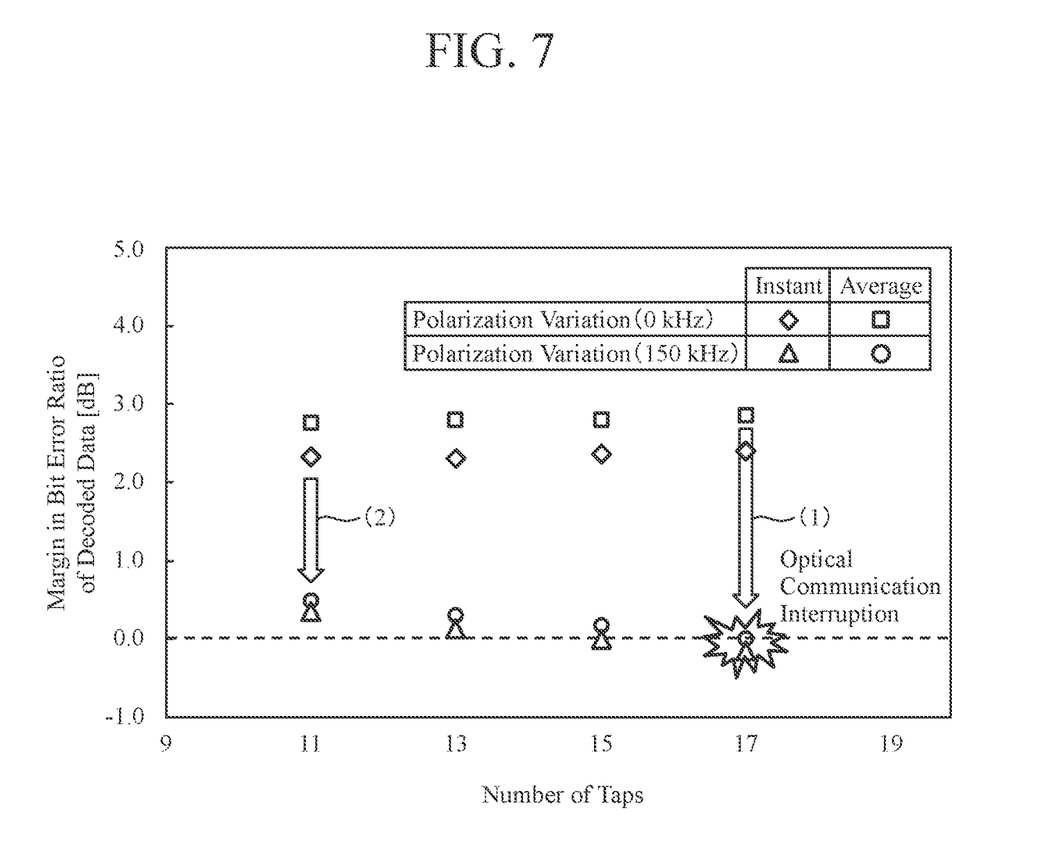
FIG. 7 is an explanatory drawing showing a relation between the number of taps of an FIR filter and a margin in a bit error ratio of decoded data.

Here, FIG. 7 is an explanatory drawing showing a relation between the number of taps of each FIR filter, and the margin in the bit error ratio of the decoded data.

In FIG. 7, the horizontal axis shows the number of taps of each FIR filter, and the vertical axis shows the margin in the bit error ratio of the decoded data.

In FIG. 7, an experimental result when no polarization variation occurs (when the polarization variation is 0 kHz), and an experimental result when a high-speed polarization variation occurs (when the polarization variation is 150 kHz) are shown.

◇ shows an instant margin when the polarization variation is 0 kHz, and □ shows an average margin when the polarization variation is 0 kHz.

Δ shows an instant margin when the polarization variation is 150 kHz, and ○ shows an average margin when the polarization variation is 150 kHz.

(1) shows changes of the margin when a high-speed polarization variation occurs in the case in which although the step size parameter is adaptively controlled using the method described in Patent Literature 1, the number of taps of each FIR filter is constant. In FIG. 7, the number of taps of each FIR filter is fixed to 17.

(2) shows changes of the margin when a high-speed polarization variation occurs in the case in which the number of taps of each FIR filter is set up by the tap number controller 25.

In FIG. 7, the number of taps of each FIR filter is set to Tc1=11 because the margin is greater than the threshold Th.

In the case of using the method described in Patent Literature 1, because both the instant margin and the average margin are greater than 0.0, as shown by (1), when the polarization variation is 0 kHz, there does not occur degradation in the transmission quality which is caused by the polarization variation, and there is a low possibility that an optical communication interruption is caused.

In the case of using the method described in Patent Literature 1, because the instant margin is less than 0.0, as shown by (1), when the polarization variation is 150 kHz, the degradation in the transmission quality which is caused by the polarization variation is large, and there is a high possibility that an optical communication interruption is caused.

In the case in which the number of taps of each FIR filter is set up by the tap number controller 25, because both the instant margin and the average margin are greater than 0.0, as shown by (2), when the polarization variation is 0 kHz, there does not occur degradation in the transmission quality which is caused by the polarization variation, and there is a low possibility that an optical communication interruption is caused.

Even in the case in which the number of taps of each FIR filter is set up by the tap number controller 25, both the instant margin and the average margin are reduced, as shown by (2), when the polarization variation is 150 kHz.

However, because both the instant margin and the average margin are greater than 0.0, as shown by (2), the degradation in the transmission quality which is caused by the polarization variation is small, and there is a low possibility that an optical communication interruption is caused.

Figure 8:
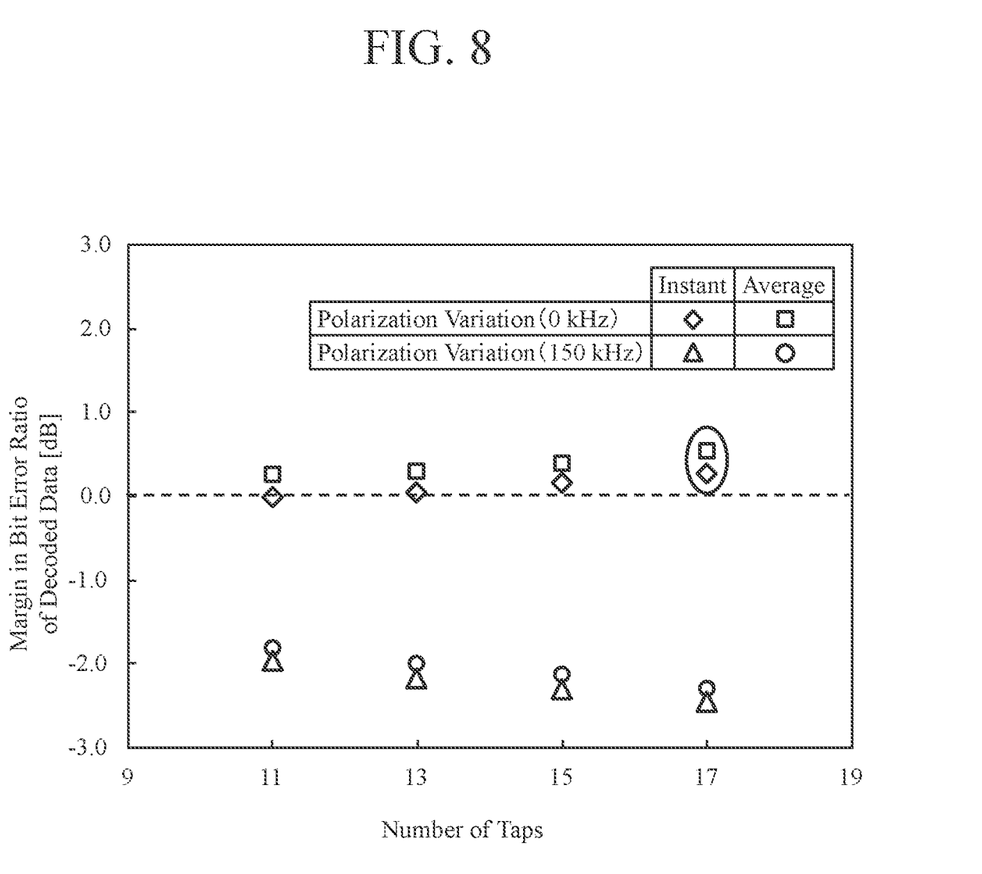
FIG. 8 is an explanatory drawing showing a relation between the number of taps of an FIR filter and a margin in a bit error ratio of decoded data.

FIG. 8 is an explanatory drawing showing a relation between the number of taps of each FIR filter, and the margin in the bit error ratio of the decoded data.

In FIG. 8, the horizontal axis shows the number of taps of each FIR filter, and the vertical axis shows the margin in the bit error ratio of the decoded data.

In FIG. 8, an experimental result when no polarization variation occurs (when the polarization variation is 0 kHz), and an experimental result when a high-speed polarization variation occurs (when the polarization variation is 150 kHz) are shown.

◇, □, Δ, and ○ show margins, like those of FIG. 7.

The margins shown in FIG. 8 are less than those shown in FIG. 7.

In the case of using the method described in Patent Literature 1, also in FIG. 8, the number of taps of each FIR filter is fixed to 17, like in FIG. 7.

In FIG. 8, because the margin is equal to or less than the threshold Th, the number of taps of each FIR filter is set to Tc2=17 by the tap number controller 25.

Even in the case in which the number of taps of each FIR filter is set up by the tap number controller 25, and even in the case of using the method described in Patent Literature 1, both the instant margin and the average margin are less than 0.0 when the polarization variation is 150 kHz. Therefore, the degradation in the transmission quality which is caused by the polarization variation is large, and there is a high possibility that an optical communication interruption is caused.

Even if the number of taps of each FIR filter is set to Tc1=11 by the tap number controller 25, because the margin when the polarization variation is 0 kHz is small, both the instant margin and the average margin are less than 0.0 when a high-speed polarization variation occurs. Therefore, a high priority is given to an improvement of the performance of improving the bit error ratio, so that the number of taps of each FIR filter is set to Tc2=17.

Even in the case in which the number of taps of each FIR filter is set up by the tap number controller 25, and even in the case of using the method described in Patent Literature 1, both the instant margin and the average margin are greater than 0.0 when the polarization variation is 0 kHz. Therefore, the degradation in the transmission quality which is caused by the polarization variation is small, and there is a low possibility that an optical communication interruption is caused.

In above-mentioned Embodiment 1, the optical receiver 1 is configured in such a way as to include the tap number controller 25 for setting up the numbers of taps of the first and second FIR filters on the basis of the respective margins calculated by the margin calculator 24. Therefore, the optical receiver 1 can suppress the degradation in the transmission quality which is caused by the influence of the polarization variation even in the case in which the polarization variation is a rapid one varying in a time of several tens of microseconds.

Embodiment 2

In the optical receiver 1 of Embodiment 1, the example in which the error ratio calculator 23 calculates the bit error ratios of the first and second decoded data is shown.

In Embodiment 2, an error ratio calculator 23 repeatedly calculates the bit error ratio of first decoded data multiple times, and compares the multiple calculated bit error ratios to determine a bit error ratio to be outputted to a margin calculator 24. An optical receiver 1 in which the error ratio calculator 23 also calculates repeatedly the bit error ratio of second decoded data multiple times, and compares the multiple calculated bit error ratios to determine a bit error ratio to be outputted to the margin calculator 24 will be explained.

Hereinafter, the process of calculating bit error ratios in the error ratio calculator 23 will be explained concretely.

A calculation time period which is a time period during which to perform the process of calculating bit error ratios is stored in an internal memory of the error ratio calculator 23. For example, the calculation time period is 1 minute.

Further, the length of calculation time intervals at which a bit error ratio is repeatedly calculated is stored in the internal memory of the error ratio calculator 23. For example, the length of calculation time intervals is 1 millisecond.

The calculation time period and the length of calculation time intervals may be provided for the error ratio calculator 23 from the outside.

The error ratio calculator 23 repeatedly calculates the bit error ratio of the first decoded data at calculation time intervals during the calculation time period.

The error ratio calculator 23 compares the multiple bit error ratios of the first decoded data which have been repeatedly calculated during the calculation time period.

The error ratio calculator 23 selects the largest bit error ratio out of the multiple bit error ratios of the first decoded data, and outputs the selected bit error ratio to the margin calculator 24.

Further, the error ratio calculator 23 repeatedly calculates the bit error ratio of the second decoded data at calculation time intervals during the calculation time period.

The error ratio calculator 23 compares the multiple bit error ratios of the second decoded data which have been repeatedly calculated during the calculation time period.

The error ratio calculator 23 selects the largest bit error ratio out of the multiple bit error ratios of the second decoded data, and outputs the selected bit error ratio to the margin calculator 24.

In above-mentioned Embodiment 2, the error ratio calculator 23 repeatedly calculates the bit error ratio of each decoded data multiple times, and compares the multiple calculated bit error ratios to determine each bit error ratio to be outputted to the margin calculator 24.

Therefore, when the length of time intervals at which the bit error ratio is repeatedly calculated is shorter than the variation time of the polarization variation, the bit error ratio of each decoded data, the bit error ratio being adapted to the polarization variation, can be calculated.

It is to be understood that a combination of the above-mentioned embodiments can be made, various changes can be made in any component according to any one of the above-mentioned embodiments, or any component according to any one of the above-mentioned embodiments can be omitted within the scope of the present disclosure.

INDUSTRIAL APPLICABILITY

The present disclosure is suitable for an optical receiver, a light signal receiving method, and a data reproduction device that set up the number of taps of a finite impulse response filter.

REFERENCE SIGNS LIST 1 optical receiver, 11 light source, 12 coherent receiver, 13 analog to digital converter, 14 digital signal processor, 21 adaptive equalizer, 22 error corrector, 23 error ratio calculator, 24 margin calculator, 25 tap number controller, 30 data reproducer, 41 adaptive equalization circuit, 42 error correction circuit, 43 error ratio calculation circuit, 44 margin calculation circuit, 45 tap number setting circuit, 51 memory, and 52 processor.

What is claimed is:

1. An optical receiver comprising:
   a coherent receiver performing coherent detection on polarization multiplex light into which first polarization light and second polarization light are multiplexed, and splitting the polarization multiplex light into the first polarization light and the second polarization light;
   an adaptive equalizer compensating waveform distortion of a signal superimposed onto the first polarization light by using a first finite impulse response filter, compensating waveform distortion of a signal superimposed onto the second polarization light by using a second finite impulse response filter, and by decoding each of the signals whose waveform distortion has been compensated, generating their respective decoded data;
   an error ratio calculator calculating a bit error ratio of each decoded data generated by the adaptive equalizer;
   a margin calculator calculating a margin from a bit error ratio of an error correction limit in each bit error ratio calculated by the error ratio calculator; and
   a tap number controller setting up numbers of taps of the first and second finite impulse response filters by referring to respective margins calculated by the margin calculator.

2. The optical receiver according to claim 1, wherein the optical receiver comprises an error corrector performing error correction to each decoded data generated by the adaptive equalizer, and calculating a number of error corrections in each decoded data, and wherein the error ratio calculator calculates the bit error ratio of each decoded data from the number of error corrections in the decoded data, the number being calculated by the error corrector.

3. The optical receiver according to claim 1, wherein the error ratio calculator repeatedly calculates the bit error ratio of each decoded data multiple times, compares the multiple calculated bit error ratios for each decoded data, and determines one among the calculated bit error ratios to be outputted to the margin calculator for each decoded data.

4. The optical receiver according to claim 1, wherein the tap number controller sets the numbers of taps of the first and second finite impulse response filters to a first tap number when each margin calculated by the margin calculator is greater than a threshold, whereas the tap number controller sets the number of taps of the first and second finite impulse response filters to a second tap number larger than the first tap number when each margin is equal to or less than the threshold.

5. A light signal receiving method comprising the steps of:
   performing coherent detection by a coherent receiver, on polarization multiplex light into which first polarization light and second polarization light are multiplexed, and splitting the polarization multiplex light into the first polarization light and the second polarization light;
   compensating waveform distortion by an adaptive equalizer, of a signal superimposed onto the first polarization light by using a first finite impulse response filter, compensating waveform distortion of a signal superimposed onto the second polarization light by using a second finite impulse response filter, and by decoding each of the signals whose waveform distortion has been compensated, generating their respective decoded data;
   calculating a bit error ratio by an error ratio calculator, of each decoded data generated by the adaptive equalizer;
   calculating a margin by a margin calculator, from a bit error ratio of an error correction limit in each bit error ratio calculated by the error ratio calculator; and
   setting up number of taps by a tap number controller, of the first and second finite impulse response filters by referring to respective margins calculated by the margin calculator.

6. A data reproduction device comprising:
   a coherent receiver for performing coherent detection on polarization multiplex light into which first polarization light and second polarization light are multiplexed, and splitting the polarization multiplex light into the first polarization light and the second polarization light;
   an adaptive equalizer compensating waveform distortion of a signal superimposed onto the first polarization light by using a first finite impulse response filter, compensating waveform distortion of a signal superimposed onto the second polarization light by using a second finite impulse response filter, by decoding each of the signals whose waveform distortion has been compensated, generating their respective decoded data;
   an error ratio calculator calculating a bit error ratio of each decoded data generated by the adaptive equalizer;
   a margin calculator calculating a margin from a bit error ratio of an error correction limit in each bit error ratio calculated by the error ratio calculator;
   a tap number controller setting up numbers of taps of the first and second finite impulse response filters by referring to respective margins calculated by the margin calculator; and
   a data reproducer reproducing each decoded data generated by the adaptive equalizer.

* * * * *